United States Patent [19]

Marshall, III et al.

[11] 3,897,344

[45] July 29, 1975

[54] FREQUENCY-PROGRAMMED ELECTRON-CAPTURE DETECTOR

[75] Inventors: J. Howard Marshall, III, Pasadena; Timothy A. Harrington, Sierra Madre, both of Calif.

[73] Assignee: MDH Industries, Inc., Pasadena, Calif.

[22] Filed: July 31, 1974

[21] Appl. No.: 493,337

[52] U.S. Cl. .................. 250/386; 250/387; 250/388
[51] Int. Cl. ............................................ G01n 23/12
[58] Field of Search..................... 250/386, 387, 388

[56] References Cited
UNITED STATES PATENTS
3,671,740  6/1972  Marshall et al..................... 250/386

Primary Examiner—James W. Lawrence
Assistant Examiner—T. N. Grigsby
Attorney, Agent, or Firm—Arthur V. Doble

[57] ABSTRACT

Improved system of circuitry for increasing the sensitivity of a frequency-programmed electron-capture detector over a wide range of detector operation reduces the variation in the speed of response with sample concentration and includes a limit detector, delay circuit and counter to select by mostly inexpensive digital means the proper frequency of pulses which are applied to the detector. The electron-capture detector operated as part of this system produces a signal responsive to concentrations of predetermined compounds, such as gases, in the form of a pulse frequency which will vary directly with the concentration of the sampled compound in that detector. Common frequency-to-voltage conversion devices or digital counting techniques can be used as a means for indicating the level of such concentrations.

13 Claims, 2 Drawing Figures

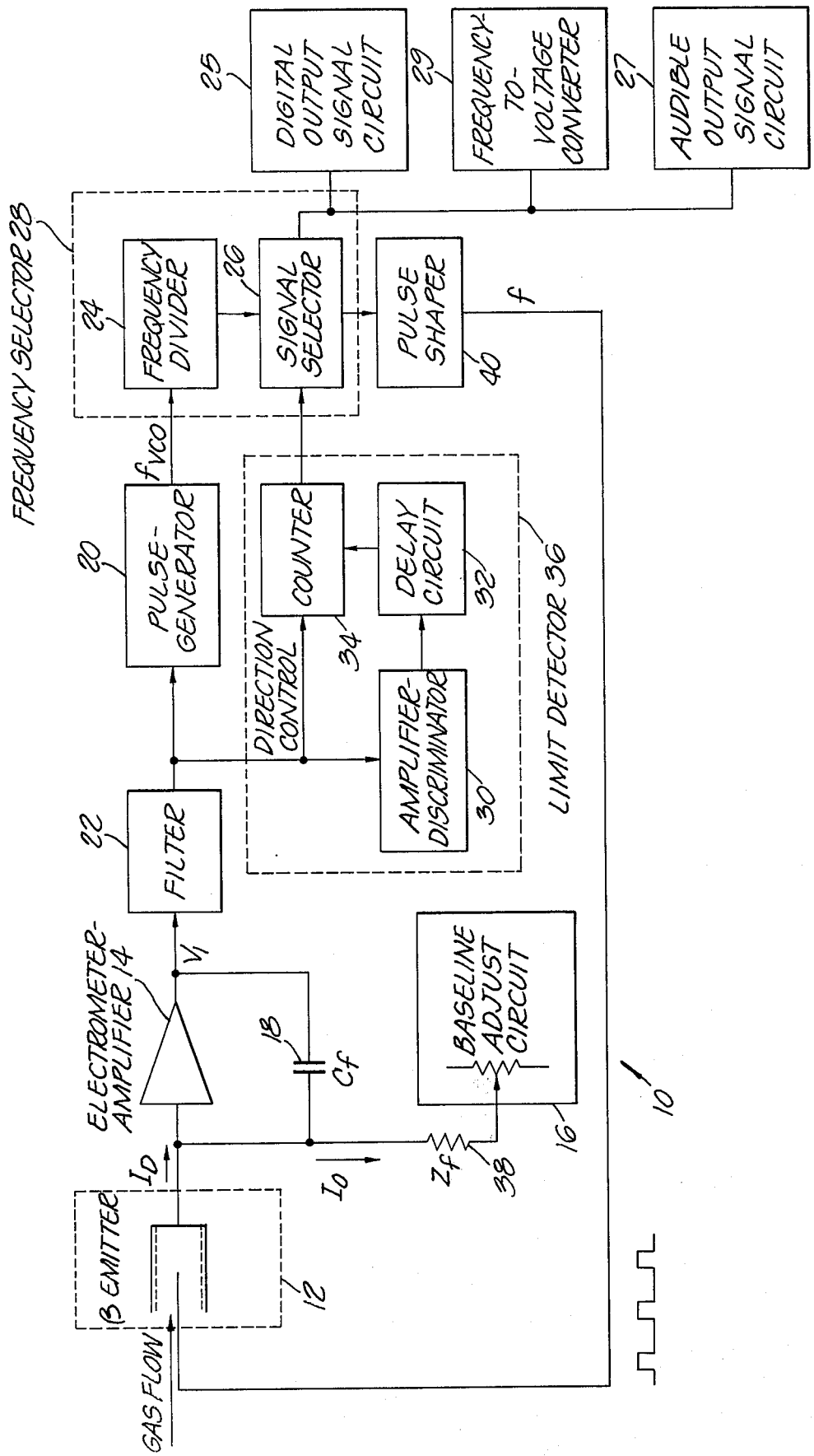

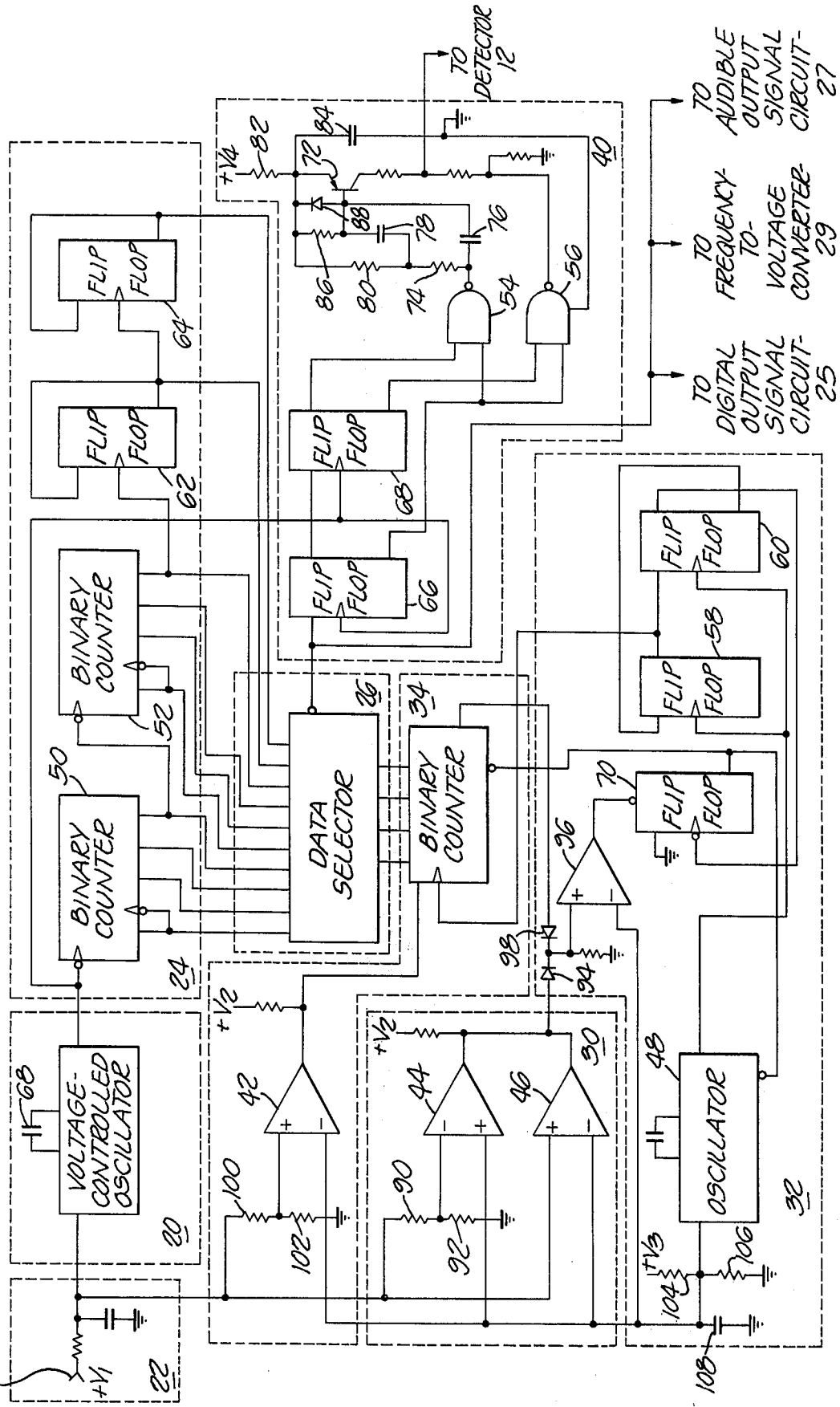

FREQUENCY-PROGRAMMED ELECTRON-CAPTURE DETECTOR

BACKGROUND OF THE INVENTION

1. Field of the Invention

This invention relates to apparatus for analyzing gases and vapors to determine the presence of selected compounds and more particularly to apparatus for increasing the sensitivity and improving the range of operation of electron-capture ionization detectors.

2. Description of the Prior Art

In the U.S. Pat. to Conrad S. Josias, et al., No. 3,714,421, issued Jan. 30, 1973, a gas detector and analyzer was described which utilized an electron-capture ionization detector to signal the presence of very low concentrations of different chemical compounds in an environment. That patent cited and relied upon a prior patent to James E. Lovelock, U.S. Pat. No. 3,247,375, which taught an electron-capture ionization detector and circuits which made such a device a useful tool for analysis.

Earlier, James E. Lovelock delivered a paper entitled "Analysis by Gas Phase Electron Absorption" at the Seventh International Symposium on Gas Chromatography Discussion Group of the Institute of Petroleum held at the Falkoner Centret, Copenhagen, Denmark, from June 25 to June 28, 1968. The paper was subsequently published by the Institute of Petroleum of London, Wl, Great Britain in 1969 as part of a volume entitled "Gas Chromatography, 1968," edited by C. L. A. Harbourn.

The Lovelock paper described in some detail the history of the electron-capture detector noting that electron absorption was a technique almost entirely dependent upon gas chromatography for its existence, the "electron-capture" detector being so sensitive that it could function efficiently only with pure vapors greatly diluted in a clean stream of carrier gas emerging from a chromatograph column. That article is considered supplementary to and cumulative of Lovelock's prior papers, including the article "Ionization Methods for the Analysis of Gases and Vapors," published at page 162 in the February, 1961, issue of "Analytical Chemistry," Volume 33, No. 2, and a subsequent paper entitled "Electron Absorption Detectors and the Technique for their Use in Quantitative and Qualitative Analysis by Gas Chromatography," published at page 474 of "Analytical Chemistry," Volume 35, No. 4, of April 1963.

In the Gas Chromatography 1968 article, Lovelock also described the chemical and physical basis for the operation of the electron-capture detector and discussed the parameters that were important in the construction of such a detector. At page 102, Lovelock discussed the method of operating such electron-capture detectors. A severe drawback of the earliest versions was the limited dynamic range of such detectors. The dc method then employed applies a fixed potential difference between the electrodes of the detector. The detector is subjected to a stream of inert carrier gas which does not itself absorb electrons. The potential is adjusted to a value sufficient to collect all of the electrons liberated from the carrier gas by a radiation source which ionizes the gas.

An electron-absorbing vapor introduced into the gas stream collects the free electrons to produce negative molecular ions which then recombine with the positive ions resulting from ionizing radiation. The change in current flow attributable to the presence of electron-capturing compounds is determined. If the decrease of current flow is measurable, then a quantitative indication of the electron-absorbing compound can be achieved.

Alternatively, the potential can be increased to a value that maintains the current flow at a constant value and the change of potential would also represent a measure of the quantity of electron-absorbing compound present. Yet other methods utilize higher potentials, but generally, such higher potentials result in a nonlinear response to vapor concentration.

As described by Lovelock in the 1963 Analytical Chemistry paper, above, a pulsed sampling technique can be employed involving the use of brief pulses of potential, at relatively infrequent intervals. Lovelock suggested a 50-volt pulse of 0.5-microseconds duration, at intervals of approximately 100 microseconds. This pulsed sampling procedure enjoyed several advantages in that:

a. for most of the time, no field is applied to the detector so that free electrons are in thermal equilibrium with gas molecules;

b. the sampling pulse is so brief that no significant movement of negative ions occurs, avoiding inaccuracies due to space-charge effects or the collection of negative ions at the anode;

c. a pulse amplitude of 30 volts is sufficient to collect all of the electrons;

d. the ultimate sensitivity is increased since the time for encounter between absorbing molecules and electrons is extended to the point where natural recombination limits any further increase in sensitivity; and e. except for those compounds whose absorption cross-sections increase greatly with small increases in energy, and for which sensitivity improves only in dc systems, the pulse method is much more reliable, and in general, sensitivity is improved.

In the Josias, et al., patent the pulsed sampling technique as described by Lovelock was modified. A highly-stable pulse source, for example, a crystal-controlled oscillator whose short-term frequency stability exceeds one part in $10^8$, was provided. The magnitude of the pulses was reduced to approximately 30 volts, and the pulse duration was extended to 3 microseconds. These pulses were repeated at 100-microsecond intervals. It appeared that the lower-voltage pulses of longer duration also adequately swept all of the electrons from the ionization detector and provided a current which, when averaged, could be used to signal concentration.

In the case Chromatography article, Lovelock, at pages 102 and 103, disclosed yet other improved pulse methods for increasing the dynamic range of the detector. In these methods a negative-feedback system controlled the pulse repetition frequency in such a manner so as to hold the detector current nearly constant in the presence of differing amounts of electron-absorbing compounds. This article thus described detectors which do not produce directly signals for measurement but which control variable-frequency pulse-generators, the frequency of which provides the concentration measurement.

Although the relationship between the detector current and the concentration of a predetermined electron-capturing compound may be extremely nonlinear, the relationship between frequency and concentration is, for all practical purposes, a highly linear one. The change in frequency can then be a measure of concentration and can directly provide an output signal over a very wide range of sample concentrations. In many instances the details of the design of the overall feedback system and the pulse-generator itself limit the range over which this method produces a linear result and also determine the speed with which it responds to changing sample concentrations.

One circuit was disclosed by Lovelock in which the output of an electrometer amplifier controlled the frequency of a pulse-generator by means of a comparison with a reference current. The result of the comparison was used to set the pulse interval. The output of such a system was not a current to a recorder but was a digital or frequency signal. Circuit details limited the maximum pulse repetition frequency to about 300 kHz and the dynamic range in sample concentration to 60,000:1 under ideal conditions.

In the U.S. Pat. No. 3,671,740, dated June 20, 1972 and assigned to the Analog Technology Corporation of Pasadena, Calif., the inventors therein, J. Howard Marshall III and Timothy M. Harrington, who are also applicants herein, disclosed and described their improved extended-dynamic-range device which they termed a "frequency-programmed electron-capture detector." That patent describes a particular technique for producing variable pulse repetition frequency between 5 kHz and 5 MHz, thus increasing the dynamic range of the detector under ideal conditions to 1,000,000:1.

In that invention a comparator was provided which compared the electrometer output with a reference to control a pulse-generator; an essential aspect of that invention being the application of the reference in the form of a ramp signal. A relaxation circuit produced this ramp in a repetitive, linear fashion from a reference voltage in such a manner that its output voltage returned rapidly to near the reference voltage whenever the ramp voltage became equal to the electrometer voltage. The resulting variable-frequency pulse generator formed by the comparator and the relaxation circuit and programmed by the electrometer output voltage could operate between 5 kHz and 5 MHz or over a 1,000:1 range. These components were included in a negative-feedback loop as suggested by Lovelock in the Gas Chromatography article in order to linearize the response of the electron-capture detector to large sample concentrations. The electrometer output was initially adjusted in the presence of a stream of pure carrier gas to give a pulse repetition frequency near 5 kHz, and deviations from this frequency from as small as 5 Hz up to the maximum operating frequency of 5 MHz provided the 1,000,000:1 dynamic range.

Two problems are inherent in this design. First, this configuration produces a response time which is inversely proportional to the operating frequency, causing a 1,000-to-1 variation in response time with sample concentration and fundamentally limiting the speed of response at low concentrations. Second, the construction of a variable-frequency pulse generator with a 1000:1 range using analog techniques is difficult and expensive in that signals at the millivolt level must be handled accurately at high frequencies. The invention described herein overcomes both of these disadvantages of the "frequency-programmed electron-capture detector" described in U.S. Pat. No. 3,671,740 by using digital techniques to provide the required wide range of pulse repetition frequencies applied to the detector.

SUMMARY OF THE INVENTION

Applicants herein have conceived of an improved extended-dynamic-range device of the class previously termed a "frequency-programmed electron-capture detector." The overall operation of the frequency-programmed electron-capture detector is described in the Marshall III et al. U.S. Pat. No. 3,671,740, dated June 20, 1972. In the present invention, the output frequency is still related to the detector signal exactly as described in that patent. However, now the system of circuitry operates by using digital techniques involving a limit detector, a delay generator, a counter and a programmable frequency divider to reduce the range of pulse repetition frequencies from the voltage-controlled oscillator, which is a form of variable-frequency pulse-generator, from 1,000:1 to 2:1. Because the voltage-controlled oscillator only operates over a 2:1 range, it becomes simple and inexpensive, and, moreover, the speed of response changes only 2 to 1 with sample concentration. Digital techniques then easily extend the operation of this simple oscillator to a 1,000:1 frequency range to provide the same operating range as described in U.S. Pat. No. 3,671,740, but the variation in response time with sample concentration remains only 2 to 1.

The ability to produce this large frequency range depends on a limit detector, which generates a signal whenever the voltage controlling the voltage-controlled oscillator is above or below its normal operating range. After a delay time, the limit-detector output steps a counter to select a higher or lower frequency from a programmable digital frequency divider. The counter steps in the direction required to make the control voltage of the voltage-controlled oscillator closer to the center of its preferred operating range. The delay circuit serves to make certain that the effects of one step of the selector have had time to take effect before additional steps occur.

The present invention provides several features of novelty over the prior art, including the capability of the system to operate over a wide range of detector sample concentrations with a reduced variation in the speed of response; the capability of the system circuit elements to perform and operate in a non-marginal, non-severe manner, particularly with regards to the voltage-controlled oscillator which only needs to operate over a 2-to-1 frequency range; and the ability of the system to perform in a manner such that the frequency of the output signal depends mainly on the detector itself and not upon a highly-sensitive calibration of electronic circuits, thus providing increased reliablility.

It is an object of this invention to provide an improved frequency-programmed electron-capture detector. It is a further object of this invention to provide a system for operating an electron-capture detector in a pulse mode applying a variable fequency of pulses to the detector in order to extend the range of concentration of electronegative gases to which the detector responds in a predictable manner.

It is a further object of this invention to provide a system for operating an electron-capture detector in a veriable-frequency mode in a manner that the output signal depends mainly upon the detector and the gas within the detector, and not upon sensitive or complex calibrations of electronic circuits, thus providing increased reliability of both the circuit and of the measurement of concentration of electronegative gas within the detector.

It is a further object of this invention to provide a circuit for operating an electron-capture detector in a variable-frequency mode while reducing variations in the speed of response of the detector and the circuit from changes in the amount of electronegative gas within the detector. It is a further object of this invention to provide a circuit design to perform a variable-frequency operation that requires circuit components with easily-satisfied functional specifications.

For a better understanding of the present invention, together with other and further objects thereof, reference is made to the following description taken in connection with the accompanying drawings in which preferred embodiments of the invention are illustrated, the scope of the invention being pointed out and contained in the appended claims.

BRIEF DESCRIPTION OF THE DRAWINGS

FIG. 1 is a block diagram of a frequency-programmed electron-capture detector system; and FIG. 2 is a detailed circuit diagram of the preferred embodiment of the system of FIG. 1.

DESCRIPTION OF THE PREFERRED EMBODIMENTS

Turning to FIG. 1, there is shown, in block diagram, a system involving a frequency-programmed electron-capture detector in the usual negative-feedback configuration employing the pulse repetition frequency. There is shown an electron-capture detector circuit 10 which includes the electron-capture detector 12. The electron-capture detector 12, which may be identical to that disclosed in the Josias, et al., U.S. Pat. No. 3,714,421 or to that disclosed in any of the Lovelock publications, is connected to the input of an electrometer-amplifier 14. A baseline-adjust circuit 16 is also connected to the input of the electrometer-amplifier 14, so that it may reduce the total current flowing to or from the input of the electrometer-amplifier 14 under one set of operating conditions. The output of the electrometer-amplifier 14 is fed back to the input via the integrating capacitor 18, so that the current pulses from the detector 12 when combined with the continuous signal from the baseline-adjust circuit 16 produce a sawtooth waveform, which is then further filtered to produce a smoothly-varying voltage proportional to the average value of the difference between the baseline and detector currents. Because the electrometer-amplifier 14 has a large gain, the operation of the overall feedback loop will force this current difference to become infinitesimal. the A pulse-generator 20 has its input connected to the output of the filter 22 so that the output frequency from the pulse-generator 20 becomes proportional to the output voltage of the electrometer-amplifier 14. The output of the pulse-generator 20 is connected to a frequency divider 24 that produces a series of frequencies proportional to the output of the pulse-generator 20. The outputs from the frequency divider 24 are applied to a signal selector 26 connected so that one of the series of frequencies from the frequency divider 24 appears at the output of the signal selector 26. The frequency divider 24 together with the signal selector 26 constitute a frequency selector 28. The selected frequency is used to generate a series of pulses with the same repetition frequency as the selected frequency. These pulses are applied to the detector 12 and sweep the detector of charged particles, providing the detector current at the input of the electrometer-amplifier 14.

The output signal from the filter 22 is also connected to an amplifier-discriminator 30. This amplifier-discriminator 30 produces a signal whenever the output voltage of the electrometer-amplifier 14 is outside the nominal operating range. The output of the amplifier-discriminator 30 is applied to a delay circuit 32 which actuates a counter 34 after a suitable delay. The counter controls the signal selector 26 mentioned above. The counter 34 operates in conjunction with the amplifier-discriminator 30 to change the frequency by discrete steps by selecting outputs from the frequency divider 24 in order to maintain the output of the electrometer-amplifier 14 within the nominal operating range. The amplifier-discriminator 30, together with the delay circuit 32 and the counter 34 constitute a limit detector 36.

Operation of this system depends upon the operating characteristics of the electron-capture detector 12. As the frequency of pulses applied to the detector 12 is increased, the probability that an electron will be captured by an electronegative molecule or by a positive ion decreases. Thus the current flowing in the detector 12 increases with increasing frequency for a fixed composition of gas flowing through the detector 12. As the amount of electronegative compound within the detector 12 increases, the probability that an electron is captured increases. Thus an increase in electronegative-compound concentration causes a decrease in current flowing in the detector 12. If the system baseline-adjust circuit 16 is set to produce a very small signal when little or no electronegative compounds are in the detector 12, then increasing the concentration of electronegative compounds will produce an increase in the current from the electrometer-amplifier 14, thus tending to cause the electrometer-amplifier 14 to rise to a more-positive voltage. This increase is coupled to the pulse-generator 20, causing it to increase its output frequency, tending to force the net current into the electrometer-amplifier 14 back into equilibrium with the current of the baseline-adjust circuit 16. When the amplifier-discriminator 30 senses that the output of the electrometer-amplifier 14 is more positive than the nominal operating range of the pulse-generator 20, then it causes the signal selector 26 to connect a higher frequency from the divider 24 to the detector 12, causing the output of the electrometer-amplifier 14 to decrease. A similar operating sequence occurs when the concentration of electronegative compounds decreases: the output of the electrometer-amplifier 14 becomes more negative, decreasing the frequency of the pulse-generator 20 and when the lower limit of the operating range of the pulse-generator 20 is reached the amplifer-discriminator 30, delay circuit 32, and counter 34 cause selection of a lower-frequency output from the counter 34. The delay circuit 32 between the amplifier-discriminator 30 and the counter 34 is required to allow time for the circuits to reach their final value before deciding if it is necessary to step the counter 34 additional times.

It will be seen that the system will stabilize at a frequency value which is directly proportional to the concentration of electron-capturing compounds in the stream of carrier gas.

Given the apparatus illustrated in FIG. 1, the mathematical basis for the linear relationship between frequency and concentration and the speed of response to changing sample concentrations can be derived from a consideration of the following relationships.

Consider a mixture of a carrier gas 1 and an electronabsorber compound 2.

Table 1

$t$ = time from the end of the application of a voltage pulse to the detector.

$R_e$ = rate of electron production from a radioactive $\beta$-emitter including electron-multiplication processes in the carrier gas.

$N_T$ = total number of molecules in the detector.

$N_{D_1}$ = number of positively-ionized carrier-gas molecules in the detector at $t = 0$.

$N_{D_2}$ = number of electron-absorbing gas molecules in the detector at $t = 0$.

$N_{A_1}(t)$ = number of ionized carrier-gas molecules that have captured one electron at a time $t$.

$N_{A_2}(t)$ = number of electron-absorbing gas molecules that have captured one electron at a time $t$.

$N_e(t)$ = total number of electrons in the detector at a time $t$.

$\sigma_1$ = probability per unit time of capture of an electron by an ionized carrier-gas molecule which has not captured one electron (i.e., "recombination" rate).

$\sigma_2$ = probability per unit time of capture of an electron by an electron-capturing gas molecule which has not captured one electron. The rate of production of electrons is given by:

$$\left.\frac{dN_e(t)}{dt}\right|_{production} = R_e \qquad (1)$$

The rate of removal of electrons by means of electron capture by gas molecules is given by:

$$-\left.\frac{dN_e(t)}{dt}\right|_{removal} = N_e(t)\left[\sigma_1\left(N_{D_1}-N_{A_1}\right) + \sigma_2\left(N_{D_2}-N_{A_2}\right)\right] \qquad (2)$$

The first term in Equation (2) represents recombination of electrons with positive ions in the carrier gas. These ions were produced by the electron multiplicative processes starting with the energetic $\beta$ particles. The second term in Equation (2) represents the capture of electrons by electronegative gas molecules. Both of these terms can be trivially generalized to include more than two gas species.

Combining the differential Equations (1) and (2) gives the net rate of electron production:

$$\frac{dN_e(t)}{dt} = R_e - N_e(t)\left[\sigma_1\left(N_{D_1}-N_{A_1}\right) + \sigma_2\left(N_{D_2}-N_{A_2}\right)\right] \qquad (3)$$

Assume that at the end of a given period T all the electrons in the detector are swept out by a voltage pulse with a width short with respect to T. In addition, assume that $N_A$ is negligible with respect to $N_D$. Then at equilibrium:

$$N_e(0) = 0,$$

and TM (4a)
and $$\frac{dN_e(t)}{dt} = R_e - N_e(t)\left[\sigma_1 N_{D_1} + \sigma_2 N_{D_2}\right] = R_e - N_e(t)\alpha_1, \qquad (4b)$$

where $$\alpha_1 = \sigma_1 N_{D_1} 30 \; \sigma_2 N_{D_2}.$$

Integration and evaluation of the integration constant by utilization of the boundary condition $N_e(t) = 0$ when $t = 0$ gives:

$$N_e(t) = \frac{R_e}{\alpha_1}\left(1 - e^{-\alpha_1 t}\right). \qquad (5)$$

If $\alpha_1 t << 1$, the exponential may be expanded in a power series, neglecting all but the first, second and third order terms:

$$N_e(t) \cong \frac{R_e}{\alpha_1}\left(1 - \left[1 - \alpha_1 t + \frac{\alpha_1^2 t^2}{2} - \frac{\alpha_1^3 t^3}{6}\right]\right).$$

$$= R_e t \left(1 - \frac{\alpha_1 t}{2} + \frac{\alpha_1^2 t^2}{6}\right). \qquad (6)$$

The average detector current is given by:

$$I_D = \frac{N_e(T)q}{T}, \qquad (7)$$

where T is the pulse interval and $q$ is the charge on the electron ($1.6 \times 10^{-19}$ C). In Equation (7) is contained implicitly the assumption that Equations (1) and (2) apply during the period when the voltage pulse is present. This assumption is based on the discussion presented by Wentworth, Chen and Lovelock on page 449 of their article appearing in the Journal of Physical Chemistry, 70, 445 (1966). In that discussion, they determined that, for a carrier gas containing 90 percent argon and 10 percent methane, the average electron energy would be increased only slightly above its thermal value during the application of the pulse. They then presented data to confirm this prediction. From (6) and (7) the expression for the average detector current then becomes $$I_D \cong qR_e\left(1 - \frac{\alpha_1 T}{2} + \frac{\alpha_1^2 T^2}{6}\right). \qquad (8)$$

If the baseline detector current is defined by $$I_B = qR_e$$

then the decrease in baseline current due to electron-capture processes is derived from (8) and (9):

$$\Delta I = B - D \cong qR_e \left[ 1 - \left( 1 - \frac{\alpha_1 T}{2} + \frac{\alpha_1^2 T^2}{6} \right) \right]$$
$$= \frac{qR_e \alpha_1 T}{2} \left( 1 - \frac{\alpha_1 T}{3} \right). \quad (10)$$

For $(\alpha_1 T)/3 \ll 1$, the fractional decrease in baseline current is:

$$\frac{\Delta I}{I_B} \cong \frac{\alpha_1 T}{2}, \quad (11)$$

indicating that $\Delta I$ is approximately proportional to $\alpha_1$.

If the definition of $\alpha_1$ given in Equation (4) is used, Equation (11) then becomes:

$$\frac{\Delta I}{I_B} \cong \frac{T}{2} \left( N_{D_1} \sigma_1 + N_{D_2} \sigma_2 \right). \quad (12)$$

indicating the approximate proportionality of detector current change to the number of electron-absorbing gas molecules in the detector 12.

In the derivation of Equation (11), $\alpha_1 T/3$ was assumed to be small with respect to 1. Thus Equation (11) is accurate only if $(2\Delta I)/(3I_B)$ is kept small. If the period T is allowed to be programmed so that this inequality holds, then the dynamic range for linear operation can be vastly increased over that resulting from fixed-period (or fixed-frequency) operation.

The relationship can be demonstrated by considering that the output voltage $V_1$ of the electrometer-amplifier 14 of FIG. 1 is proportional to the decrease in detector current: $I_B - I_D = \Delta I$ (Equation 10). In addition, a current $I_o$ is subtracted from the detector current by the baseline-adjust circuit 16. The difference of these currents then flows into the electrometer-amplifier input so that $$V_1 = Z_f(I_o - I_D) = Z_f(I_o - I_B + \Delta I), \quad (13)$$

where $Z_f$ is the effective feedback impedance of the electrometer-amplifier 14 and is related to the values of the feedback capacitor 18, the resistor $Z_f$ 38, to the baseline adjustment circuit 16 and the voltage gain of the electrometer-amplifier 14. Under most circumstances the resistive component of resistor $Z_f$ 38 is sufficiently large so that $Z_f \cong 1/pC_f$, where $p$ is the Laplace-Transform variable.

Furthermore, the output frequency, $f_{vco}$, from the pulse-generator 20 is also linearly related to the output voltage of the electrometer-amplifier 14 by $$f_{vco} = f_{vco,o} + k_1 V_1, \quad (14)$$

where $f_{vco,o}$ is the voltage-controlled oscillator frequency of the pulse-generator 20 for $V_1 = 0$ and $k_1$ is the gain of the pulse-generator 20. Thus, the pulse frequency, $f$, applied to the detector 12 becomes $$f = \frac{f_{vco}}{N} = \frac{f_{vco,o} + k_1 V_1}{N} = \frac{f_{vco,o} + k_1 Z_f(I_o - I_D)}{N} \quad (15)$$

where N is an integer representing the value of the selected frequency division.

Equation 15 taken in conjunction with Equation (11) using the relationship that $T = 1/f$ then implies that $$f = \alpha_1 \frac{I_B}{2(I_B - I_o)} \left\{ \frac{1}{1 + \frac{Nf - f_{vco,o}}{k_1 Z_f(I_B - I_o)}} \right\}. \quad (16)$$

which, for steady-state signals and for the resistive component, $R_f$, of $Z_f$ being sufficiently large, reduces to the simple form:

$$f \cong \alpha_1 \frac{I_B}{2(I_B - I_o)} = \frac{(\sigma_1 N_{D_1} + \sigma_2 N_{D_2}) I_B}{2(I_B - I_o)}, \quad (17)$$

illustrating explicitly the proportionality between the pulse repetition frequency, $f$, and the number of sample molecules, $N_D$.

If the pulse repetition frequency has a value $f_o$ when $N_D = 0$, then $$\Delta f = f - f_o = C\alpha_2 f_o,$$

where $$f_o = \frac{\sigma_1 N_{D_1} I_B}{2(I_B - I_o)}, \quad (19a)$$

$$C = \frac{N_{D_2}}{N_{D_1} + N_{D_2}} = \frac{N_{D_2}}{N_T} = \text{sample concentration}, \quad (19b)$$

and $$\alpha_2 = \frac{\sigma_2 N_T}{\sigma_1 N_{D_1}}. \quad (19c)$$

Equation (18) expresses the direct proportionality between the change in the pulse repetition frequency, $\Delta f$, and the sample concentration, C.

In order for this analysis to be accurate, the inequality, $2\Delta I/3I_B \ll 1$, must be satisfied. The magnitude of this quantity can be calculated from Equations (11), (17) and (19a) to yield:

$$\frac{2\Delta I}{3I_B} \cong \frac{N_{D_1} \sigma_1}{3f_o}. \quad (20)$$

Thus, the deviation from Equation (11) is a constant as a function of $N_D$ and $f$ and $N_D$ as described by Equations (17) or (18). Typically for a carrier gas in the detector consisting of 95 percent argon with 5 percent methane, $$N_{D_1} \sigma_1 = 1.5 \text{ kHz}. \quad (21)$$

For this case in the preferred embodiment, $f_o$ is chosen to be 5 kHz so that Equation (20) has a value of 10 percent.

The restriction that $f_o$ be large compared to $N_{D_1}\sigma_1/3$ is essential only for computational convenience in deriving Equation (17). Even if $f_o$ has a lower frequency or the frequency corresponding to $\sigma_1 N_{D_1}$ is higher as a result of electro-negative gases being present, the proportionality between $\Delta f$ and $C$ still holds. The proportionality constant $\alpha_2$ must be modified compared to Equation (19c), however, to take into account such nonlinearities in the baseline.

The lower limit for $\Delta f$ is given by the instabilities in the baseline frequency $F_o$. In the preferred embodiment, these fluctuations are determined by small changes in the properties of the carrier gas (or impurities contained in it) and not by electronic drifts. Typically these fluctuations are about 5 Hz for $f_o = 5$ kHz in nearly pure 95 percent A, 5 percent $CH_4$ carrier gas.

The upper limit for $f$ results from the non-zero time required to collect the electrons from the detector 12. Typically this time is less than 100 ns. In the preferred embodiment, an upper operating frequency of 5 MHz was chosen, resulting in a 200-ns minimum period between pulses. Experimentally it has been found that total charge collection can be made to occur during the 50- to 100-ns wide pulse from the pulse shaper 40. A slight deviation from linear performance has been found at frequencies above 1 MHz, probably resulting from the fact that the electron energies are not precisely thermal during the period that the pulse from pulse shaper 40 is applied to the detector 12. However, satisfactorily linear operation has been achieved using the preferred embodiment for values of $\Delta f$ between 5 Hz and 5 MHz, thus extending the linear dynamic range for the electron-capture detector 12 over six decades.

Therefore, it will be appreciated that the expected dynamic range of the detector 12 for compounds, such as sulfur hexafluoride ($SF_6$), would be approximately six decades. This dynamic range would also be applicable to electron-capturing compounds that are up to 1/100 as electronegative as sulfur hexafluoride.

The other approximation involved in deriving Equation (17) from Equation (16) was that the effective feedback impedance of the electrometer-amplifier 14 was sufficiently large such that $$\frac{NF-f_{vco,o}}{K_1 Z_f(I_B-I_o)} << 1. \quad (22)$$

In the steady state where $Z_f \cong R_f$, this inequality implies in the worst case that $$R_f >> \frac{f_{vco,max}-f_{vco,o}}{k_1(I_B-I_o)} = \left(\frac{2f_o}{\sigma_1 N_{D_1}}\right) \frac{(f_{vco,max}-f_{vco,o})}{k_1 I_B} \quad (23)$$

where use has been made of Equation (19a). In the preferred embodiment for which typically $f_o = 5$ kHz, $\sigma_1 N_D = 1.5$ kHz, $f_{vco,max} = 5$ MHz, $f_{vco,o} = 1.44$ MHz, $k_1 = 0.81$ MHz/V and $I_B = 3 \times 10^{-8}$ A, then Equation (23) implies that $R_f << 1.15 \times 10^{-9}$ Ω

Although this inequality is easily satisfied for steady-state conditions, fast transients in the sample concentration reflected by a change in $\alpha_1$ to $\alpha_1' + \delta\alpha_1$ will cause the inequality of Equation (22) to be violated momentarily. The calculation of the effect of the finite impedance $Z_f = 1/pC_f$ on small, fast transients will provide an estimate of the speed of the response of this system to small changes in sample concentration.

For this calculation, we shall assume that the concentation changes suddenly as represented in Laplace-Transform notation by $\delta\alpha_1/p$ and that a change in pulse repetition frequency from $f$ to $f' = \delta f$ then ensues with a finite speed of response. We shall consider both $\delta\alpha_1$ and $\delta f$ to be small quantities which need to be considered only to first order, and we shall also assume that the feedback loop is initially in equilibrium so that Equation (17) accurately describes the relationship between $f$ and $\alpha_1$ before the transient occurs.

Under these assumptions, the transient change in $\alpha_1$ produces a small perturbation of the output voltage of the electrometer-amplifier 14, $\delta V_1$, given by $$\delta V_1 = \frac{\delta(\Delta I)}{pC_f} \cong \frac{I_B}{2pC_f f}\left[\frac{\delta\alpha_1}{p} - \frac{\delta f}{f}\right], \quad (24)$$

where use has been made of Equations (13) and (11), together with the fact that $T = 1/f$. From Equation (24) in conjunction with Equations (14) and (15), we can write that $$\delta f \cong \frac{\left(\frac{f}{\alpha_1}\right)\cdot\frac{\delta\alpha_1}{p}}{1 + \frac{pC_f 2 f_{vco}}{k_1 I_B}\left(\frac{f}{\alpha_1}\right)} \quad (25)$$

or, using Equation (17), that $$\delta f \cong \left(\frac{I_B}{2(I_B-I_o)}\right)\left(\frac{\delta\alpha_1}{p}\right)\frac{1}{1+p\tau} \quad (26)$$

where $\tau$ is the response time constant and is given by $$\tau = \frac{C_f f_{vco}}{k_1(I_B-I_o)}. \quad (27)$$

From Equations (26) and (27) it can be clearly seen that the speed of response is proportional to the frequency of the pulse-generator 20 but is independent of the magnitude of the frequency division, N. For the circuit described in U.S. Pat. No. 3,671,740, a similar calculation shows that the response time constant varies inversely as the frequency of pulse-generator 20. In that case, this frequency varied over a 1000:1 range (with N fixed at 1), and, as a result, the speed of response also varied over this range as the sample concentration changed. However, in the invention described herein, the frequency of the pulse-generator changes over only a 2:1 range, whereas N changes over a 512:1 range, and thus the speed of response remains constant within a factor of 2 for small concentration changes.

This reduction in the variation of the speed of response becomes particularly important when sample concentrations are small and the pulse repetition rate is near its minimal value of 5 kHz. Because the filter must remove the 5-kHz ripple present in the output of the electrometer-amplifier 14 and because the feedback loop must also be stable for high sample concentrations producing 5MHz pulse repetition rates, the minimum response time constant cannot be much smaller than about 200 μs. If, as in the circuit of U.S. Pat. No. 3,671,740, the response time is inversely proportional to the pulse-generator 20 frequency, then the response time at small concentrations can become as large as 200 ms. If, however, the configuration of this invention is used, the worst-case response time for small concentration changes becomes much reduced to about 0.4 ms.

The output of the signal selector 26, an element of the frequency selector 28, is also applied to a digital output signal circuit 25 and an audible output signal circuit 27 to provide output signals proportional to the concentration of an electron-capturing compound. The output of the signal selector 26 is also applied to a frequency-to-voltage-converter 29 to provide an output voltage signal porportional to and representative of the frequency of the pulsed signal applied to the electron-capture detector 12.

FIG. 2 illustrates a circuit design for implementing the functions of the block diagram in FIG. 1. FIG. 2 includes the filter circuit 22, as well as the pulse-generator 20, frequency divider 24, signal selector 26, pulse shaper 40, counter 34, and limit detector 36, i.e., amplifier-discriminator 30, delay circuit 32 and counter functions. The electrometer-amplifier 14 and baseline-adjust circuit 16 employ techniques well known to those versed in the art.

The schematic diagram contains various logic symbols. The symbols are in accordance with American National Standard No. ANSI Y32.14-1973. The elements used include voltage comparator amplifiers 42, 44 and 46 symbolized by triangles; integrated-circuit pulse-generators 20 and 48 symbolized by rectangular blocks; 4-bit binary counters 50 and 52 symbolized by rectangular blocks; a multi-input data signal selector 26 symbolized by a rectangular block; a 4-bit up-down binary-coded-decimal counter 34 symbolized by a rectangular block; NAND gates 54 and 56; D-type flip-flops 58, 60, 62, 64, 68; and one JK-type flip-flop 70. The signal polarities used in this circuit are: 2.5- to 5-V positive level is a true or logic-one signal, and a 0- to 1-V level is a false or logic-0 signal. When a flip-flop is described to be "set," the upper of its two outputs is or becomes a logic 1 and the lower of its two outputs become a logic zero.

In FIG. 2 an integrated-circuit pulse-generator 20 produces a frequency linearly related to the input voltage applied on the upper left pin. This frequency range is selected by capacitor 72, and in this instance is approximately 4.5 MHz at a 1-V input and 11 MHz at a 5-V input.

The frequency divider circuit 24 is made up of four binary counter elements: 50, 52, 62, and 64. Counters 50 and 52 are 4-bit binary counters. Binary counters 62 and 64 are connected as 1-bit binary counters. The connections shown provide the function of a 10-bit binary frequency divider that produces output frequencies of $F_o/2$, $F_o/4$, $F_o/8$, etc., down to $F_o/1024$. These outputs are connected to 10 inputs of the signal selector 26.

The selector 26 routes one of the 10 inputs to it from the frequency divider 24 to its output. Selection of which one is determined by the four lines shown entering the bottom of the selector 26. Selection is made by considering the state of the signals on the four lines are a binary number, with the first line being the least-significant ($2^0$) bit and the last line being the most-significant ($2^3$) bit.

The pulse shaper 40 includes provision for controlling the width and amplitude of the pulse applied to the detector 12 in FIG) 1. The pulse width is determined by the output signal, $F_o$, of the pulse-generator 20 through use of the two binary elements 66 and 68, and the logic gates 54 and 56. When an incoming signal on the upper left pin of flip-flop 66 moves from a high to a low state, on the next succeeding low-to-high transition of the signal, $F_o$, the output of flip-flop 66 on its upper right moves from high to low; and, on the following low-to-high transition of $F_o$, the output of flip-flop 68 on its upper right pin moves from low to high. During the interval when the output of flip-flop 66 of its upper right pin is low and the upper right pin of flip-flop 68 is high, both inputs to gate 54 are high, causing its output to be low, turning on transistor 72 by means of the circuit comprising resistor 74, capacitor 76, capacitor 78, and resistor 80. Transistor 72 being on makes the detector pulse signal rise toward $V_o$ the detector pulse voltage.

Upon the next low-to-high transition of the signal $F_o$ the one input to gate 54 moves low, which allows transistor 72 to turn off. At the same time that transistor 72 turns off, the output of gate 56 goes to its low state because both inputs to it are high. This causes the detector pulse to move toward ground, where it remains until the next succeeding positive-to-negative transition of the ouput of the selector 26. Resistor 82 and capacitor 84 provide filtering of the dectector-pulse transients, and resistor 82 additionally helps provide current limiting to protect transistor 72 in the case of a short circuit to ground of the detector pulse. Resistor 86 provides a leakage-current path to insure that transistor 72 remains off when not pulsed on, and diode 88 provides protection for the base-emitter junction of transistor 72 from possible transients that might damage transistor 72.

The amplifier-discriminator 30 is made up of two voltage comparator amplifier circuits, 44 and 46. These circuits cause their output voltage to be near ground whenever the input marked − (minus) is more positive than the input marked + (plus). Circuit 46 then causes it output to be near ground whenever the filtered signal of electrometer amplifier 14 is less thhan the value of the negative input of circuit 46. The filtered electrometer signal is attenuated by resistors 90 and than so that whenever the signal exceeds approximately 5 volts, the − (minus) input of comparator 44 exceeds 1 V, and thus the output of comparator 44 becomes near ground. By connecting the two outputs together as shown, a signal that is high only when the filtered electrometer signal lies between one and five volts is produced. This signal is applied to the delay circuit 32 through diode 94.

The delay circuit 32 receives the out-of-limit signal from the amplifier-discriminator 30, causes the counter 34 to step one time, and then waits for a predetermined time before allowing the out-of-limit condition to step the counter 34 again. When the out-of-limit condition occurs, the output of comparator 96 moves low, unless the signal from the counter 34 through diode 98 is high. Comparator 96 moving low causes flip-flop 70 to set, and the lower right pin of flip-flop 70 moves to ground, which enables the pulse-generator 48 and the counter 34. The output of pulse-generator 48 then becomes a pulse train at a 4-kHz rate. The initial low-to-high transition of this train causes the upper right pin on flip-flop 58 to move from low to high, advancing the counter 34 one step. The two flip-flops 58 and 60 from a divide-by-four circuit so that after four low-to-high transitions of the clock signal from pulse-generator 48, both flip-flops 58 and 60 will return to their initial states. The fourth transition causes the upper right pin of flip-flop 60 to move from the high to the low state, resetting flip-flop 70 and stopping the pulse-generator 48 unless the out-of-limit signal from comparator 44 and comparator 46 is still in the low state, in which case the counter 34 will be stepped once again through its sequence.

The counter 34 is a 4-bit binary-coded-decimal counter capable of counting either up or down in response to signals on its clock, enable, and down inputs. Outputs are the four-bit binary code on upper outputs of $2^0$, $2^1$, $2^2$ and $2^3$. A count of zero is represented by the upper outputs all zero, and a count of 9 is shown by the outer outputs being 1, with the inner outputs being zero. The counter 34 counts up (0, 1, 2, etc.) when the down input is zero, and down (3, 2, 1, 0) when the down input is a logical 1. Counting occurs on the positive-going transition of the upper left clock input, but only if the enable input is at ground. The max/min output becomes a logic 1 when the count is 0 in the down direction or 9 in the up direction.

The inputs to the counter 34 include the clock input and the enable from the delay circuit 32 that cause it to count once after the delay circuit 32 has been triggered and the down signal that is obtained from comparator 42. The down signal is a logic 1 whenever the filtered electrometer signal is more positive than 3 V, as established by comparing the filtered electrometer signal after being attenuated by resistor 100 and resistor 102 with the 1-V potential. If the filtered electrometer signal is more positive than 5 V, which will cause the delay circuit 32 to operate via comparator 44, diode 94, comparator 96 and flip-flop 70, then necessarily the down signal will be a logic 1, and the count produced by the operation of delay circuit 32 will cause the counter number to decrease, increasing the frequency of the detector pulse signal.

The function of the max/min output and diode 98 is to prevent the counter 34 from stepping down when it reaches its minimum value of zero or up when it reaches its maximum value of 9. The circuit consisting of resistor 104, resistor 106 and capacitor 108 provides the 1-V signal required by the comparator and VCO circuits.

What is claimed as new is:

1. For use in combination with an electron-capture detector, an improved pulse-generating circuit for providing an output signal having a frequency corresponding to and representative of the concentration of an electron-capturing compound, the improved circuit comprising:
   a. amplifier means coupled to the electron-capture detector for providing an output signal representative of the relative concentration of an electron-capturing compound in a sample quantity;
   b. pulse-generator means coupled to the amplifier means for providing pulses of variable frequencies which frequencies vary over a range less than the range of frequencies of the output signal of said circuit, the pulse-generator means being operable in response to the amplifier means output signal;
   c. limit detector means coupled to the amplifier means and the pulse-generator means, for generating a signal whenever the amplifier means output signal controlling the pulse-generator means is above or below the operating range of the pulse-generator means; and
   d. frequency selector means coupled to the pulse-generator means, limit detector means, and the electron-capture detector for reducing the range of pulse repetition frequencies from the pulse-generator means, the frequency selector means being operable in response to the output signal of the limit detector means,
   whereby the rate of pulses applied to the electron-capture detector will maintain the amplifier means output signal within the operating range of the pulse-generator means so that a signal having a frequency proportional to and representative of the concentration of an electron-capturing compound in a sample is fed back from the pulse-generator means to the electron-capture detector.

2. The circuit of claim 1, above, wherein said pulse-generator means comprises a voltage-controlled oscillator operable over a frequency range on the order of 2 to 1.

3. The circuit of claim 1, above, wherein the limit detector means comprises:
   a. amplitude-discriminator means coupled to the amplifier means output signal controlling the pulse-generator means for determining the magnitude of the amplifier means output voltage;
   b. delay means coupled to the amplifier-discriminator means for permitting one step of the selector to take place before additional steps occur; and
   c. counter means coupled to the delay means and the amplifier means for generating a signal whenever the signal controlling the pulse-generator means is above or below its normal operating range.

4. The circuit of claim 1, above, wherein the frequency selector means comprising:
   a. a plurality of binary-counting means coupled to the pulse generator means for providing the function of a 10-bit binary frequency divider that produces selectable output frequencies of $F_o/2$, $F_o/4$, $F_o/8$, et cetera down to $F_o/1024$; and
   b. signal selector means coupled to the binary-counting means for selecting an output frequency from the binary-counting means.

5. The circuit of claim 1, above, further comprising: frequency-to-voltage-converting means coupled to the frequency selector means for providing an output voltage signal proportional to and representative of the frequency of the pulsed signal applied to the electron-capture detector.

6. The circuit of claim 1, above, further comprising: audible output means coupled to the frequency selector means for generating an audible output tone whose pitch corresponds to and is representative of the frequency of the pulsed signal applied to the electron-capture detector.

7. The circuit of claim 1, above, further comprising: audible output means coupled to a frequency-to-voltage-converting means for generating an audible output tone whose pitch corresponds to and is representative of the frequency of the pulsed signal applied to the electron-capture detector.

8. The circuit of claim 1, above, wherein the pulsed signal applied to the electron-capture detector has a pulse repetition frequency of 5 Mhz response to high concentration of an electron-absorbing compound and a pulse repetition of 5 kHz in response to an absence of electron-capturing compound in a sample quantity.

9. The circuit of claim 1, above, further comprising digital output means coupled to the frequency selector means for further dividing its output frequency to a range compatible with digital output devices, whereby the digital output corresponds to and is representative of the concentration of electron-capturing compound in a sample quantity.

10. The circuit of claim 4, above, further comprising: pulse shaping means coupled to the signal selector means for producing pulses of width and amplitude which will operate the electron-capture detector.

11. For use in combination with an electron-capture detector, an improved pulse-generating circuit for providing an output signal having a frequency corresponding to and representative of the concentation of an electron-capturing compound, the improved circuit comprising:
  a. amplifier means coupled to the electron-capture detector for providing an output signal representative of the relative concentation of an electron-capturing compound in a sample quantiy;
  b. a voltage-controlled oscillator, operable over a frequency range of approximately 2 to 1, coupled to the amplifier means for providing pulses of variable frequencies which frequencies vary over a range less than the range of frequencies of the output signal of said circuit, the voltage-controlled oscillator being operable in response to the amplifier means output signal;
  c. amplitude-discriminator means coupled to the amplifier means output signal controlling the voltage-controlled oscillator for determining the magnitude of the amplifier means output voltage;
  d. delay means connected to the amplifier-discriminator means for permitting one step of the selector to take place before additional steps occur;
  e. counter means connected to the delay means and the amplifier means for generating a signal whenever the signal controlling the voltage-controlled oscillator means is above or below its operating range; and
  f. frequency selector means coupled to the voltage-controlled oscillator, and amplifier-discriminator means, the delay means, the counter means, and the electron-capture detector, the frequency selector means being operable in response to the output signal of the counter means.

12. The circuit of claim 11, above, where the frequency selector means comprising:
  a. a plurality of binary-counting means connected to the voltage-controled oscillator for providing the function of a 10-bit binary frequency divider that produces selectable output frequencies of $F_o/2$, $F_o/4$, $F_o/8$, et., down to $F_o/1024$; and
  b. signal selector means connected to the binary-counting means for selecting the output frequency from the binary counting means.

13. For use in combination with an electron-capture detector, an improved pulse-generating circuit for providing an output signal having a frequency corresponding to and representative of the concentration of an electron-capturing compound, an improved circuit comprising:
  a. amplifier means coupled to the electron-capture detector for providing an output signal representative of the relative concentration of an electron-capturing compound in a sample quantity;
  b. a voltage-controlled oscillator, operable over a frequency range of approximately 2 to 1, coupled to the amplifier means for providing pulses of variable frequencies which frequencies vary over a range less than the range of frequencies of the output signal of said circuit, the voltage-controlled oscillator being operable in response to the amplifier means output signal;
  c. amplitude-discriminator means coupled to the amplifier means output signal controlling the voltage-controlled oscillator for determining the magnitude of the amplifier means outut voltage;
  d. delay means connected to the amplifier-discriminator means for permitting one step of the selector to take place before additional steps occur;
  e. counter means connected to the delay means and the amplifier means for generating a signal whenever the signal controlling the voltage-controlled oscillator means is above or below its operating range;
  f. a plurality of binary-counting means connected to the voltage-controlled oscillator for providing the function of a 10-bit binary frequency divider that produces selectable output frequencies of $F_o/2$, $F_o/4$, $F_o/8$, etc., down to $F_o/1024$; and
  g. signal selector means connected to the binary-counting means for selecting the output frequency from the binary counting means.
  h. frequency-to-voltage-converting means coupled to the signal selector means for selector means for providing an output voltage signal proportional to and representative of the frequency of the pulsed signal applied to the electron-capture detector;
  i. audible output means coupled to the signal selector means for generating an audible output tone whose pitch corresponds to and is representative of the frequency of the pulsed signal applied to the electron-capture detector;
  j. digital output means coupled to the signal selector means for further dividing its output frequency to a range compatible with digital output devices, whereby the digital output corresponds to and is representative of the concentration of electron-capturing compound in a sample quantity; and
  k. pulse shaping means coupled to the signal selector means for producing pulses of widths and amplitudes which will operate the electron-capture detector.

* * * * *